3,652,505
RADIATION SENSITIVE POLYURETHANES

Adnan A. R. Sayigh and Fred A. Stuber, North Haven, and Henri Ulrich, Northford, Conn., assignors to The Upjohn Company, Kalamazoo, Mich.
No Drawing. Filed Mar. 2, 1970, Ser. No. 15,949
Int. Cl. C08g 22/04, 22/16
U.S. Cl. 260—77.5 AQ — 4 Claims

ABSTRACT OF THE DISCLOSURE

Radiation (both heat and light)-sensitive polyurethanes are provided and are useful in the preparation of coatings which can be chemically bonded, by exposure to an appropriate source of radiation, to substrates containing C—H bonds (preferred substrates are polyolefins). The exposure can be carried out selectively in accordance with photoresist system technology or can be carried out over complete surfaces so as to bond paint and like sealant coatings to substrates such as exterior building surfaces and the like. The radiation-sensitive polyurethanes are derived by replacing part or the whole of the active hydrogen containing component, conventionally employed to form polyurethanes (by reaction with polyisocyanates), by a polyol of the formula:

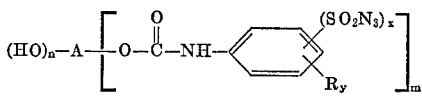

where A=residue of an aliphatic alcohol of valency $(m+n)$ and M.W. $<300$, $n$ is 2 to 5, $m$ is 1 to 4 and $m+n$ is $\not> 6$, R is lower-alkyl or halogen, $x=1$ to 2, $y=0$ to 2 and $x+y$ is $\not> 3$, and $SO_2N_3$ is in the 3, 4, or 5-position in the phenyl nucleus, one of said positions being unsubstituted.

BACKGROUND OF THE INVENTION

(1) Field of the invention

This invention relates to radiation-sensitive polyurethanes and is more particularly concerned with radiation-sensitive polyurethanes derived from polyhydroxy aliphatic esters of azidosulfonylcarbanilates, and with coatings produced from said polyurethanes and with processes for chemically bonding said coatings to substrates.

(2) Description of the prior art

The preparation of polyurethane coatings is well-known in the art as is their application as protective coatings on buildings and other structures subject to exposure to weather particularly marine structures, and on floors and like surfaces to render same resistant to abrasion by scuffing and the like; see, for example, Saunders and Frisch, Polyurethanes, Chemistry and Technology, Part II, pages 453 to 468 and 477 to 485, Interscience Publishers, New York, 1964, and U.S. Pats. 3,380,950; 3,425,973; 3,428,609; 3,432,456; 3,436,361; and 3,458,-459.

While the use of such coatings has been highly successful in the main, there have been a number of instances in which the adhesion between the coating and the substrate has weakened and/or failed particularly after prolonged exposure to weather or abrasive forces. This has proved to be a particular problem where the substrate is a material such as a polyolefin in which there are no free active hydrogen groups with which any residual isocyanate groups present in the polyurethane coating would react and thereby chemically bond the coating to the substrate.

We have now found that, using certain novel radiation sensitive polyurethanes, it is possible to effect chemical bonding between a polyurethane coating and a substrate even when the latter is free from active hydrogen containing groups which would react with free isocyanate groups in said coating. Using the novel polyurethanes and the process of this invention, it is possible not only to improve the adhesion of polyurethane coatings to substrates which contain active hydrogen atoms, but also to effect chemical bonding of polyurethane coatings to substrates such as polyolefins and the like which would not otherwise enter into chemical interaction with the polyurethane.

SUMMARY OF THE INVENTION

The novel radiation-sensitive polyurethanes of the invention comprise the product of reaction of an organic polyisocyanate, a component containing at least two active hydrogen atoms, and a catalyst for the reaction between NCO and OH groups, wherein from 1 percent by weight to 100 percent by weight of said component containing active hydrogen atoms is a polyol of the formula:

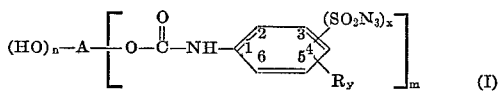
(I)

wherein A is the residue of an aliphatic alcohol having $(n+m)$ hydroxyl groups and a molecular weight of less than 300, $n$ is an integer from 2 to 5, $m$ is an integer from 1 to 4, provided that the sum of $n+m$ is not greater than 6, R is selected from the class consisting of lower-alkyl and halogen, $x$ is an integer from 1 to 2, $y$ is an integer from 0 to 2, provided that $(x+y)$ is not greater than 3, the $SO_2N_3$ group is in any of positions 3, 4, or 5 in the phenyl nucleus to which it is attached, and at least one of the said positions 3, 4, and 5 is unsubstituted.

The invention also comprises a process which comprises applying a radiation-sensitive polyurethane, as defined above, as a coating to a substrate having a plurality of C—H bonds and exposing said coated substrate to a source of radiation which activates said radiation-sensitive polyurethane and which thereby effects chemical bonding of said polyurethane to said substrate. Accordingly, the radiation-sensitive polyurethanes of the invention, defined above, are highly useful as coating materials in that, upon irradiation, said coatings are chemically bonded to the coated substrates and hence said coatings have improved resistance to separation from said substrates on exposure to weathering forces and/or mechanical and like stresses.

The term "radiation-sensitive" is used herein to mean that the polymers of the invention can be activated and undergo molecular modification on exposure to thermal and/or ultraviolet light radiation.

The term "lower-alkyl" means alkyl from 1 to 6 carbon atoms, inclusive, such as methyl, ethyl, propyl, butyl, pentyl, hexyl and isomeric forms thereof. The term "lower-alkoxy" means alkoxy from 1 to 6 carbon atoms, inclusive, such as methoxy, ethoxy, propoxy, butoxy, pentyloxy, hexyloxy, and isomeric forms thereof. The term "halogen" is employed in the usually accepted sense as being inclusive of fluorine, chlorine, bromine, and iodine.

The term "residue of an aliphatic alcohol of valency $(m+n)$ and molecular weight less than 300" means the aliphatic radical of valency $(n+m)$, wherein $n$ and $m$ have the significance above defined, which is obtained by removing all the hydroxyl groups from an aliphatic alcohol containing $(n+m)$ hydroxyl groups and having a molecular weight less than 300. Examples of aliphatic alcohols meeting said specifications are glycerol, trimethylolethane, trimethylolpropane, hexane-1,2,3-triol, erythritol, pentaerythritol, arabinose, glucose, arabitol and the like.

The term "active hydrogen atom" means a hydrogen atom which will react with methylmagnesium iodide to give methane when tested in accordance with the Zerewitinoff method, see J. Am. Chem. Soc. 49, 3181, 1927.

DETAILED DESCRIPTION OF THE INVENTION

In preparing the novel polyurethanes of the invention, the methods well-recognized in the art for the preparation of non-cellular polyurethanes are employed with the exception that the whole, or a part of, the active hydrogen containing component normally employed in the preparation of such compounds, is replaced by a polyol of the Formula I. Illustrative of the known methods of preparing such polyurethanes are those shown in Saunders et al., supra, and in the various U.S. patents set forth in the "Description of the prior art" set forth above. It is unnecessary to give a detailed description of the said conventional methods. Suffice it to say that said polyurethanes are generally prepared by reaction of an organic polyisocyanate, including any of those specifically exemplified in the above cited references, with an active hydrogen containing component, which can be a single component or a mixture of two or more components inclusive of a wide range of polyols, poly-primary amines, and hydroxyamines such as are specifically exemplified in the above-cited references. The reaction is generally carried out in the presence of a catalyst for the reaction of NCO with active hydrogen containing groups. Said catalysts are inclusive of tertiary amines such as triethylamine, trimethylene diamine, N,N-dimethylcyclohexylamine, N-ethylpiperidine, N-methylmorpholine, N,N,N',N'-tetramethylbutane diamine and the like, as well as organometallic derivatives, particularly the organo derivatives of mercury and tin, such as stannous octoate, dibutyltindilaurate, diphenylmercury dodecenylsuccinate, phenylmercuri-acetate, phenylmercuri-hydroxide and the like.

The reaction of polyisocyanate and active hydrogen containing component can be carried out using a prepolymer technique or using a one-shot procedure. In the latter procedure all the components are brought together and reacted simultaneously. In the former procedure an excess of polyisocyanate is reacted with a part of the total amount of active hydrogen containing material and the isocyanate-terminated prepolymer is then reacted in a subsequent step with the remainder of the active hydrogen material. Whichever method is used, the overall ratio of NCO to active hydrogen containing groups employed is within the range of about 1.0:1.0 to about 1.05:1.0.

The reaction is carried out advantageously at elevated temperatures, of the order of about 50° C. to about 150° C. as is well appreciated by the art. The resulting polyurethane so obtained is dissolved in a volatile inert organic solvent to form a coating composition. Alternatively, if desired, the reaction between polyisocyanate and active hydrogen containing material can be carried out in the presence of whatever volatile inert organic solvent is to be used as vehicle in the subsequent application of the polyurethane as a coating on a substrate.

By "inert organic solvent" is meant an organic solvent which does not react with any of the reactants nor interfere in any other way with the desired progress of the reaction. Examples of inert organic solvents are ethyl acetate, butyl acetate, cellosolve acetate, toluene, xylene, tetrahydrofuran, cyclohexanone, methylethyl ketone, acetone, dioxane and the like. The amount of organic solvent employed is adjusted so that the amount of polyurethane present in the reaction product at the end of the reaction will be in the range of about 5 to about 30 percent by weight.

The coating compositions prepared in accordance with the invention comprise a solution, in a volatile inert organic solvent, of a polyurethane derived from the polyols of Formula I above. Said coating composition can also contain conventional pigments, flowing agents, other resins, and like adjuvants commonly used in the coating art.

In applying the coating compositions to substrates any of the conventional techniques of application, such as brushing, spraying, rolling, dipping and the like, can be employed. The coating so produced can be allowed to dry and cure in air, or, alternatively, the drying and curing step can be combined with the irradiation process required to effect chemical bonding of the polyurethane coating to the substrate in accordance with the invention. This is particularly so when thermal radiation is the means employed to effect chemical bonding. For example, a convenient method of accomplishing simultaneously both drying and curing of the coating and chemical bonding of the coating to the substrate involves exposing the coated substrate to thermal radiation from suitable sources such as infrared lamps, heated surfaces and the like. Such process can be adapted to the production on a continuous basis of coated sheet or film material. For example, said film or sheet substrate material is first passed through a zone in which the coating with a polyurethane of the invention is carried out and the coated sheet or film material is subsequently passed through a zone in which simultaneous drying, curing, and chemical bonding, is achieved by exposure to a source of thermal radiation.

Alternatively, the step of irradiation by a suitable source of thermal or actinic radiation can be accomplished in a separate step after the coating has been allowed to dry and to cure. Indeed, in the case of application of the polyurethanes of the invention in the form of coatings to exterior surfaces, such as buildings, marine vessels, aircraft and the like, the step of irradiation to effect chemical bonding of the coating to substrate can be allowed to take place using environmental means such as prolonged exposure to sunlight.

A wide variety of sources of actinic radiation can be employed in effecting bonding of the polyurethane coatings of the invention to substrates. Such sources include carbon arcs, mercury vapor lamps, fluorescent lamps, argon glow lamps, photographic flood lamps, and tungsten lamps. Preferably the source of radiation is one which generates ultraviolet light of wavelength within the range of 250 nm. to about 390 nm.

While the novel polyurethanes of the invention can be applied as coatings and chemically bonded to a wide variety of substrates, they are particularly useful in providing chemically bonded coatings for substrates to which such coatings could not be applied hitherto. For example, the polyurethanes of the invention can be chemically bonded to substrates which contain a plurality of —C—H bonds. Such substrates are inclusive of polyolefins such as polyethylene, polypropylene and the like, natural rubbers, butyl rubbers, SBR rubbers, polyisoprene, polybutadiene, polyacrylonitrile, ethylene-propylene terpolymers, copolymers of butadiene and acrylonitrile, copolymers of butadiene and methyl methacrylate and the like. Such polymeric substrates are finding many new and useful applications in the wrapping and packaging arts, particularly in the case of clear films produced from polyethylene, polypropylene and the like. Such films have proved difficult to coat permanently with surface coatings in the form of printing, decoration and the like. The most common method of accomplishing this hitherto has been by prior treatment of the film, as by exposure to corona discharge, followed by application of conventional dyestuffs, printing ink and like materials.

We have now found that coating of such films can be accomplished simply and rapidly, in a highly economical fashion, to produce a chemically bonded coating on said film using the process described above. If desired, the irradiation step of the process can be carried out imagewise. That is to say, a negative image of the printing or other markings to be reproduced, is interposed between the coated film and the source of either thermal or actinic radiation in the irradiation step. In this manner chemical bonding of the coating to the substrate film is effected only in those portions of the coating which have been exposed to the radiation. The unexposed portions of the coatings are then dissolved away by application of a suitable solvent, leaving on the surface of the substrate the desired image chemically bonded to said substrate. The chemically bonded image coating so produced is extremely resistant to abrasion, to exposure to solvents, oil, weathering and the like and represents a novel and efficient manner of meeting a problem which has long been current in the film-wrapping industry.

In another, related use of the radiation-sensitive polyurethanes of the invention, the latter are employed as the components of a photoresist system. For example, the said polyurethanes can be used in the photographic reproduction and printing arts to produce printed masters as follows. The polyurethane is applied as a coating, in the manner described above, to an appropriate substrate such as paper, metal and like film supports normally employed in the reproduction art. A negative of the image to be reproduced, e.g. lined, screened, or half-tone negatives, or diapositives, is interposed between the support film so obtained and a source capable of producing radiation necessary to activate the radiation-sensitive polyurethane. The polyurethane in those portions of the supported film exposed to the radiation is thereby bonded to the substrate. The polymer in the unexposed portions of the film can then be removed by washing with polar solvent leaving the exposed polyurethane areas bonded to the substrate in the form of a positive image corresponding to the negative used in the irradiation step. Said image has high resistance to solvents and mechanical stresses and can be used to advantage as a master from which to reproduce copies of the original.

In similar manner, photoresist systems produced from the radiation-sensitive polyurethanes of the invention can be used in other photoresist applications such as in the printing of microcircuitry and related applications which involve production of an image, in the form of chemically bonded polymer, on a metal substrate such as copper, followed by removal, in part or in toto, of the uncoated metal by etching. Essentially the same technique as that described above in the production of printed masters is employed in the formation of the polyurethane image on the substrates.

The polyols (I), which are employed in the preparation of the polyurethanes of the invention, are readily prepared by reacting the appropriate alcohol A—(OH)$_{n+m}$, wherein A, $n$, and $m$ have the significance hereinbefore defined, with a sufficient proportion of an appropriate isocyanatobenzenesulfonyl chloride of the formula:

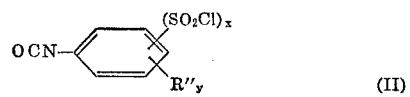

(II)

wherein R", $x$ and $y$ have the significance hereinbefore defined. By "sufficient proportion" is meant a proportion such that for each molar proportion of the starting alcohol there are $m$ molar proportions of the isocyanatobenzenesulfonyl chloride (II). The reaction is carried out under conditions well-recognized in the art for the condensation of hydroxyl and isocyanato groups. Advantageously, the reactants are brought together at ambient temperatures, i.e. of the order of 20° C. to 25° C. in the presence of an inert organic solvent, as hereinbefore defined. The reaction mixture is preferably maintained below about 50° C., after the reactants have been brought together, in order to avoid reaction of the hydroxy groups in the alcohol with the sulfonyl halide moieties in the isocyanatobenzenesulfonyl chloride. Such reaction would clearly give rise to undesired by-products.

If desired, the reaction between the alcohol and the sulfonylchloride (II) can be carired out in the presence of a catalyst. Such catalysts are those conventionally employed in the art for the catalysis of the reaction between the NCO and active hydrogen groups; see the catalysts discussed and illustrated hereinabove in describing the preparation of the novel polyurethanes of the invention.

The reaction of the alcohol and the sulfonylchloride (II) gives rise to an intermediate hydroxyalkyl carbamate (III), as follows.

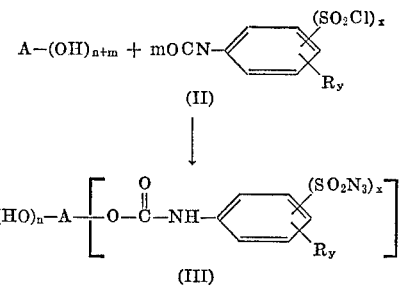

Said carbamate (III) can, if desired, be isolated from the reaction mixture, for example by evaporation of solvent, and purified, for example by recrystallization, before conversion to the desired polyol (I). However, it is generally not necessary to isolate the compound (III) prior to its conversion to the desired polyol (I). Indeed, in most instances, the reaction product obtained in the reaction of the alcohol and the sulfonylchloride (II) can be employed without any further treatment in the conversion to the polyol (I). Illustratively, the reaction product obtained in the above process, comprising the carbamate (III) in solution in inert organic solvent, is treated, without any purification, with the appropriate amount of sodium azide, i.e. 1 molar proportion of sodium azide for each sulfonylchloride group in the carbamate (III). The reaction with sodium azide is exothermic and is controlled, by cooling as required, to maintain the reaction temperature in the range of about 25° C. to about 80° C. Sodium chloride is eliminated in the reaction and precipitated from the reaction mixture thereby serving as a ready guide to the progress of the reaction. The desired alcohol (III) can be separated from the reaction mixture by conventional procedures. For example, the sodium chloride, which has precipitated, is separated by filtration and the filtrate is evaporated to dryness. The polyol (I) so isolated can be purified, if desired, by recrystallization, chromatography or like procedures prior to being employed in the sytnhesis of the novel polyurethanes of the invention.

The isocyanatobenzenesulfonyl chlorides (II) which are employed as starting materials in the preparation of the polyols (I) as described above, are, for the most part, known in the art or can be prepared from readily available starting materials, e.g. by phosgenation of the corresponding sulfanilic acids using, for example, the procedure described by Alberino et al., J. Polymer Science, vol. 5, pp. 3212–13, 1967.

The following preparations and examples describe the manner and process of making and using the invention and set forth the best mode contemplated by the inventors of carrying out the invention but are not to be construed as limiting.

PREPARATION 1

*2,2-dimethylolpropyl 4-azidosulfonylcarbanilate*

To 24 gms. (0.2 mole) of 1,1,1-trimethylolethane in 250 ml. of acetonitrile is added a solution of 10.87 gms. (0.05 mole) of p-isocyanatobenzenesulfonyl chloride in 50 ml. of acetonitrile, with stirring, over a period of 5 minutes. After stirring the resulting mixture for 45 minutes at room temperature, a total of 3.25 gms. of (0.05 mole) of sodium azide is added with stirring, while ambient temperatures are maintained. After about one hour, the reaction is complete as evidenced by cessation of sodium chloride precipitation. The precipitated sodium chloride is separated by filtration, the filtrate is evaporated to dryness and the residue is triturated with 40 ml. of acetonitrile, cooled and filtered. The filtrate solvent is evaporated to dryness in vacuo leaving 18.5 gms. of viscous liquid identified as 2,2-dimethylolpropyl 4-azidosulfonylcarbanilate.

*Analysis.*—Calculated for $C_{12}H_{14}N_4O_6S$ (percent): C, 45.53; H. 4.65. Found (percent): S, 45.88; H, 4.48.

PREPARATION 2

2,3-dihydroxypropyl 4-azidosulfonylcarbanilate

To 18.4 gms. (0.2 mole) of glycerol in 200 ml. of acetonitrile with stirring is added, dropwise, a solution of 10.87 gms. (0.05 mole) of p-isocyanatobenzenesulfonyl chloride in 50 ml. of acetonitrile. The reaction is slightly exothermic and the temperature rises from 21° C. to 26° C. After stirring the mixture for approximately 80 minutes, a total of 3.25 gms. (0.05 mole) of sodium azide is added and the resulting mixture is stirred for one hour at room temperature. The precipitated sodium chloride is filtered off and the solvent is evaporated from the filtrate. The residue is triturated in water and filtered twice, yielding 1.35 gms. (72 percent theory) of white crystals having a melting point of 114 to 116° C. Recrystallization from acetonitrile gives 2,3-dihydroxypropyl 4-azidosulfonylcarbanilate in the form of white crystals with a melting point of 120° to 123° C.

*Analysis.*—Calculated for $C_{10}H_{12}N_4O_6S$ (percent): C, 37.97; H, 3.80. Found (percent): C, 37.69; H, 4.04.

Using the procedure described above but replacing glycerol by an equivalent amount of erythritol, pentaerythritol, hexane-1,2,3-triol, arabinose, glucose,a nd arabitol, there are obtained the corresponding mono-4-azidosulfonylcarbanilates thereof.

EXAMPLE 1

To 3.28 gms. (0.0125 mole) of dicyclohexylmethane-4,4'-diisocyanate in 50 ml. of dry cyclohexanone are added 0.88 gm. (0.0075 mole) of hexanediol and 1.72 gms. (0.005 mole) of 2,2-dimethylolpropyl 4-azidosulfonylcarbanilate. As catalyst 0.06 gm. of stannous octoate is added; the temperature of the reaction mixture is maintained at 75° C. The process of the reaction is monitored by the decrease of the absorption band, due to the isocyanate group at 4.7μ in the infrared spectrum. The reaction is complete after six hours. The solution becomes viscous.

Using the procedure described above but replacing the 2,2-dimethylolpropyl 4-azidosulfonylcarbanilate by an equivalent amount of 2,3-dihydroxypropyl 4-azidosulfonylcarbanilate, erythritol mono-4-azidosulfonylcarbanilate, pentaerythritol mono-4-azidosulfonylcarbanilate, 2,3-dihydroxyhexyl 4 - azidosulfonylcarbanilate, arabinose mono-4-azidosulfonylcarbanilate, glucose mono-4-azidosulfonylcarbanilate, or arabitol mono-4-azidosulfonylcarbanilate, there are obtained corresponding polyurethane coating compositions.

Similarly using the procedure described above but replacing the dicyclohexylmethane-4,4'-diisocyanate there used by an equivalent amount of 4,4'-methylenebis (phenyl isocyanate), toluene-2,4-diisocyanate, toluene-2,6-diisocyanate, mixtures of toluene-2,4-diisocyanate and toluene - 2,6-diisocyanate, or 1,4-diethylbenzene-w,w'-diisocyanate, there are obtained the corresponding polyurethane coating compositions of the invention.

EXAMPLE 2

Films were cast on polyurethane using the light sensitive polyurethane solution prepared in Example 1. To cast the films a high speed whirler is used. The coatings have thicknesses of 0.5 to 1.0μ. The coated polyethylene was exposed to the light of a Hanovia mercury lamp type SN, the exposure plane being at 15 cm. from the mercury arc. After an irradiation time of two minutes the top coating is crosslinked and bonded to the substrate, as demonstrated by its insolubility in cyclohexanone and its resistance to abrasion.

Similarly, using the above procedure there are prepared chemically bonded coatings of polyurethane on polyethylene from any of the other coating compositions disclosed at the end of Example 1.

We claim:

1. A radiation-sensitive polyurethane which comprises the product of reaction of an organic polyisocyanate, a component containing at least two active hydrogen atoms, and a catalyst for the reaction between NCO and OH groups, wherein from 1 percent by weight to 100 percent by weight of said component containing active hydrogen atoms is a polyol of the formula:

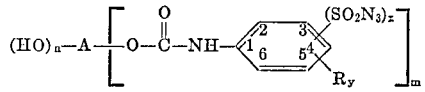

wherein A is the residue of an aliphatic alcohol having $(n+m)$ hydroxyl groups and a molecular weight of less than 300, $n$ is an integer from 2 to 5, $m$ is an integer from 1 to 4, provided that the sum of $n+m$ is not greater than 6, R is selected from the class consisting of lower-alkyl and halogen, $x$ is an integer from 1 to 2, $y$ is an integer from 0 to 2, provided that $(x+y)$ is not greater than 3, the $So_2N_3$ group is in any of positions 3, 4, or 5 in the phenyl nucleus to which it is attached, and at least one of the said positions 3, 4, and 5 is unsubstituted.

2. The radiation-sensitive polyurehtane of claim 1 wherein said polyol is 2,3-dihydroxypropyl 4-azidosulfonylcarbanilate.

3. The radiation-sensitive polyurethane of claim 1 wherein said polyol is 2,2-dimethylolpropyl 4-azidosulfonylcarbanilate.

4. A radiation-sensitive coating composition which comprises a polyurethane according to claim 1 and a volatile inert organic solvent.

References Cited

UNITED STATES PATENTS 3,455,689    7/1969    Lanidon et al. _____ 204—159.19

DONALD E. CZAJA, Primary Examiner

M. I. WELSH, Assistant Examiner

U.S. Cl. X.R.

96—68; 117—138.8 A, 138.8 E, 138.8 UA, 139, 93.31; 204—159.14; 260—30.4 N, 31.2 N, 31.4 R, 32.8 N, 33.6 UB